United States Patent [19]
Paul

[11] 3,711,718
[45] Jan. 16, 1973

[54] APPARATUS FOR DETECTING INFRARED RADIATION

[75] Inventor: Bernt Paul, Erlangen, Germany

[73] Assignee: Siemens Aktiengesellschaft, Berlin, Munich, Germany

[22] Filed: Dec. 2, 1970

[21] Appl. No.: 94,295

[30] Foreign Application Priority Data

Dec. 9, 1969 Germany................P 19 61 574.8

[52] U.S. Cl...........250/210, 73/355 R, 250/83.3 H, 317/235 Q, 324/DIG. 1, 338/25
[51] Int. Cl..................................H01j 39/12
[58] Field of Search......250/83.3 H, 210; 317/235 Q, 317/235 H; 73/355 R; 324/65 B, 62 B; 338/25, 325; 75/134 T

[56] References Cited

UNITED STATES PATENTS

| | | | |
|---|---|---|---|
| 3,416,373 | 12/1968 | Havens | 317/235 Q |
| 3,442,823 | 5/1969 | Muller et al. | 338/32 S |
| 3,267,405 | 8/1966 | Weiss et al. | 317/235 H |
| 2,986,034 | 5/1961 | Jones | 73/355 R |
| 3,164,721 | 1/1965 | Astheimer | 250/83.3 H |
| 3,226,225 | 12/1965 | Weiss et al. | 75/134 T |
| 3,483,096 | 12/1969 | Gri et al. | 250/83.3 H |

FOREIGN PATENTS OR APPLICATIONS 1,214,807   4/1966   Germany..................317/235 Q

OTHER PUBLICATIONS

Gardner, Semiconductor Temperature Sensor, IBM Technical Disclosure Bulletin, Aug. 1965, pp. 458 & 459.

Primary Examiner—Stanley T. Krawczewicz
Attorney—Curt M. Avery, Arthur E. Wilfond, Herbert L. Lerner and Daniel J. Tick

[57] ABSTRACT

An apparatus for detecting radiation and a change in position of the radiation source movable along a path has a radiation-sensitive electronic semiconductor. A bridge circuit having resistances is formed from the semiconductor and these resistances are grouped into two pairs of mutually adjacent resistances. Two of the resistances, one from each of the pairs, have respective elongated surface portions disposed one adjacent the other along a common line. The surface portions jointly cover the range over which the radiation source is movable. The apparatus is positionable to have the surfaces face the radiation so that the line is substantially parallel to the path over which the radiation source is movable.

8 Claims, 4 Drawing Figures

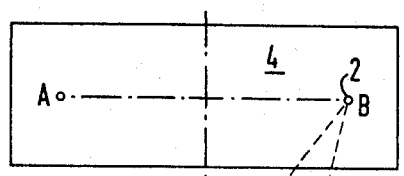
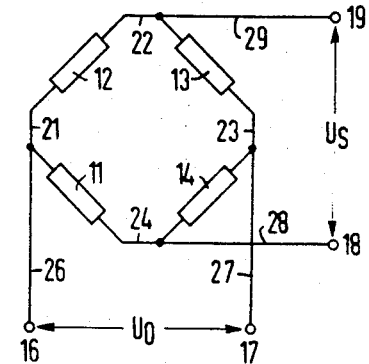
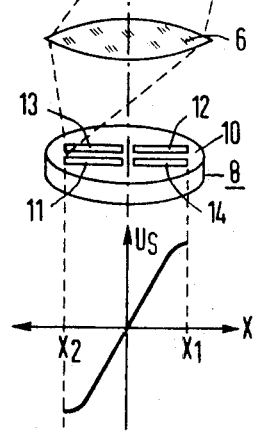
Fig. 2
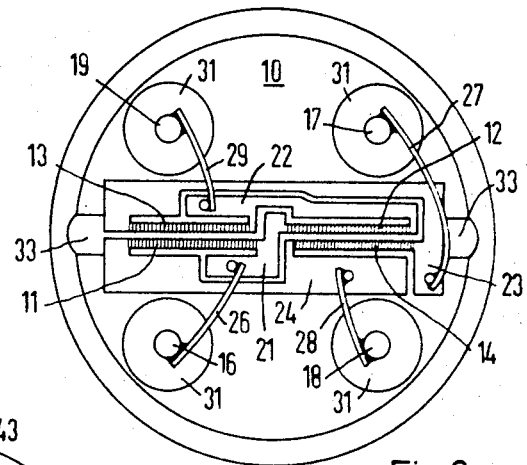
Fig. 1
Fig. 3
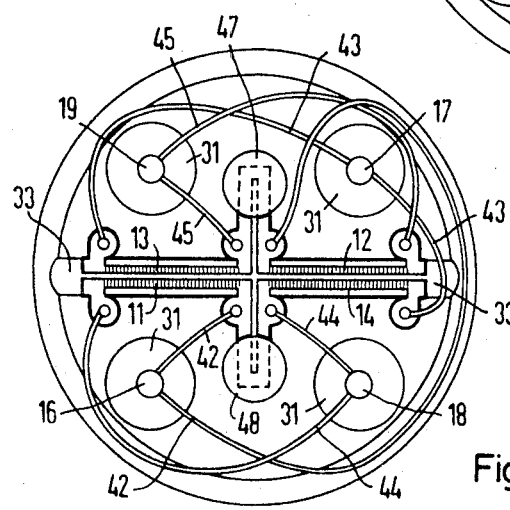
Fig. 4

APPARATUS FOR DETECTING INFRARED RADIATION

My invention relates to an apparatus for detecting radiation preferably temperature radiation, especially infrared radiation and for detecting a change of location of the radiation with a temperature sensitive electronic semiconductor element. Such thermal electronic position detectors are used to localize the location of objects with the aid of the radiation emitted from these objects. These detectors have achieved significance in medical diagnosis and research as well as for temperature investigations in the chemical industry and also for loop control in rolling mill works.

Morten and King have described an infrared position detector having a plurality of individual infrared detectors in "Infrared Physics", 1968, vol. 8, pages 9 to 14. In this position detector, the infrared detectors are disposed in a line mutually adjacent to each other. A great number of such lines form the detector surface. The individual detectors are scanned with a frequency of about 250,000 image spots per second. The sum of the individual detectors, for example 10,000 in number, can be scanned in 1/25 seconds. This apparatus is therefore suitable for infrared television transmission. However, this apparatus performs its function with a relatively large technological effort and investment in electronic parts. It further has the disadvantage that the resolving power in line direction is limited by the smallest possible separation of the individual detectors from each other, this amount being approximately 100 $\mu$m.

For different areas of application, for example, in infrared follower control systems or in loop control in wire and light-section rolling mills, there is simply required the registration of the positional departure of the radiation in a linear dimension. An arrangement for solving this task includes a rotating polygon mirror which reflects the impinging radiation onto a radiation sensitive electronic component. Determined by the mechanical arrangement of the rotating polygon mirror, a concentrated scanning ray passes a given viewing region in unison with the frequency determined by the number of turns and so directs an infrared radiation entering the region onto the detector. By means of each polygon mirror, each spot of the viewing region is scanned approximately 100 times per second. Should a gliding member of rolling material be located in the viewing range, the radiation detector is illuminated as soon as the scanning ray reaches the edge of the material being rolled. The impinging radiation produces an electrical impulse that is converted and amplified, and via a full-wave rectifier is sent to, for example, the control electrode of a thyristor. The radiation detector has a lead sulfide semiconductor body whose sensitivity region is known not to extend substantially beyond a wave length of 3 $\mu$m. The area of application is thereby correspondingly limited and in this connection, only radiators having a temperature above 200°C can be detected. The polygon mirror of this arrangement must be very precisely adjusted. In addition, because of its mechanically moving parts, the arrangement has a limited life of operation and requires a relatively large expense to maintain.

Accordingly, it is an object of my invention to provide an apparatus for detecting infrared radiation of simpler construction and improved reliability.

It is another object of my invention to provide an apparatus for detecting radiation and a change in the position of the radiation source movable along a path.

The invention is based on the concept that a known apparatus of a radiation detector with radiation sensitive resistances connected as a bridge circuit is suitable for detecting location because this apparatus provides a signal of opposite polarity when one of the adjacent resistances of the bridge circuit is irradiated.

According to a feature of the invention, a bridge circuit has resistances formed from a radiation-sensitive semiconductor body of which at least one of the adjacent resistances serves as radiation detector. These resistances are grouped into two pairs of mutually adjacent resistances. Two of the resistances, one from each of the pairs, have respective elongated surface portions disposed one adjacent the other along a common line. The surface portions jointly cover the range over which the radiation source is movable. The apparatus is positionable to have the surfaces face the radiation so that the line is substantially parallel to the path along which the radiation source is movable.

In a preferred embodiment and according to another feature of the invention, the resistances are grouped into two groups of mutually opposite resistances and the resistances of each of the groups are at least approximately mutually parallel. The two groups are disposed one adjacent the other along a common line substantially parallel to the path along which the radiation source is movable.

The radiation-sensitive resistances of such photo (quantum process) or bolometer effect (thermal process) or a radiation detector based on both effects are preferably configured in a bridge circuit. For temperature compensation, such a bridge must comprise resistances having a temperature depending that is as identical as possible. According to my copending U.S. Pat. application, Ser. No. 20,213, filed Mar. 17, 1970 and assigned to the assignee of the instant application, this requirement is fulfilled by etching the entire bridge from a crystal of the semiconductor material so that the bridge circuit is a monolithic entity.

The invention will now be described with reference to the accompanying drawing, wherein:

FIG. 1 is a schematic diagram showing the apparatus of the invention together with a path over which the source of radiation can travel and the transfer function or characteristic of the radiation detector of the apparatus;

FIG. 2 is a circuit diagram of the resistances comprising the position detector; and, FIGS. 3 and 4 illustrate respective embodiments of the position detector of the invention.

FIG. 1 shows a radiation source 2 which is preferably a temperature radiator, especially an infrared radiator. Radiation source 2 is shown at the B position and is movable through the center position to the A position. The radiation from radiator 2 is directed to a bridge detector 8 via an objective 6 of the bridge detector 8. Only a base plate 10 and the radiation sensitive resistances 11, 12, 13 and 14 are shown.

Should the radiation source 2 move from the center position to the end position A, the radiation impinging on the detector 8 will move from the center position of the resistances 11 to 14 in a direction to the outer end of resistances 12 and 14. In a similar manner, the impinging radiation will move from the center position between the resistances 11 to 14 in a direction to the outer end of resistances 11 and 13 when the radiation source moves from the center position in the opposite direction toward the end position B. Since many different kinds of radiation sources can be considered, the radiation source is simply represented by a base 4 which defines the range over which the radiation source is movable with respect to the detector.

Referring still to FIG. 1, beneath the bridge detector 8, the detector characteristic shows the output signal $U_s$ of the detector in dependence upon the distance of the impinging radiation from the midpoint of the bridge. Should the impinging radiation move toward the right from the center portion of the resistance arrangement, the impinging radiation irradiates the two resistances 12 and 14 and the bridge circuit provides a positive signal at its output as soon as the spot covered by the impinging radiation is detected by the two left ends of the resistances. The output signal is reduced somewhat from its maximum value just before the location $X_1$ as soon as a portion of the impinging beam moves out past the end of the two resistances 12 and 14. The bridge circuit provides an output signal of opposite sign in the same manner as soon as the radiation source 2 moves from its center position in a direction of position B and, correspondingly, the impinging radiation moves along to the outer end of the resistances 11 and 13 corresponding to point $X_2$ on the characteristic. In this way, at least an approximate antisymmetrical sensitivity characteristic and the output signal of the bridge circuit forms therefor a measure or index of the location of the radiation source 2.

According to the circuit diagram of FIG. 2, the radiation sensitive resistances 11 to 14 are connected to an input voltage $U_0$ which, for example, can be an alternating current voltage. The input voltage $U_0$ is connected across the input terminals 16 and 17. The output signal $U_s$ can be taken from the output terminals 18 and 19.

If only one of the two mutually adjacent resistances is radiated for example resistance 11, its resistance value $R_{11}$ increases to an amount $R_{11} + \Delta R$. If the resistance values of all resistances when not being irradiated are assumed to have all the same value R, an output signal is obtained with the increased resistance $R_{11} + \Delta R$ given by:

$$U_s = U_o \cdot (\Delta R/4R) = U_{s1}.$$

Instead of the above, if two opposite lying branches, for example, the resistances 11 and 13 are irradiated, the resistance value of the resistance 13 will also increase in value in correspondence with the increase in value of resistance 11 to an amount $R + \Delta R$. In this instance, an output signal is obtained given by $$U_s = U_o \cdot (\Delta R/2R) = 2U_{s1}.$$

With the foregoing it is possible to provide an embodiment of the invention with a bridge circuit wherein only one of the mutually opposite lying bridge branches is irradiated in a given instance. When the mutually opposite lying bridge branches of which the resistances are arranged mutually parallel, the sensitivity of the arrangement can be raised by a factor of two.

For the objective 6 in FIG. 1, a lens objective or mirror objective can be used.

In the embodiment of the radiation detecting apparatus according to FIG. 3, the resistances 11 to 14 are formed from a crystal of the semiconductor material of a first crystalline phase preferably of indium antimonide with inclusions of a second crystalline phase. The inclusions comprise a material of good electrical conductivity such as nickel antimonide (NiSb), the electrical conductivity of the latter being higher than the electrical conductivity of the first phase material. Preferably, the resistances 11 to 14 are formed from the crystal of semiconductor material by etching. The mutually opposite resistances 11, 13 and the mutually opposite resistances 12, 14 are mutually parallel, respectively. These two pair of parallel resistances are elongated and extend along a common line substantially parallel to the path over which the radiation source is movable and so are located to detect the possible departure of the latter from a central reference position. To emphasize the functioning resistance regions of the semiconductor body, these portions are designated in FIGS. 3 and 4 by hatching. The interconnects 21, 22, 23 and 24 do not introduce significant resistance because of their considerably large cross-section. If desired, the resistance value of these connecting leads can be further reduced advantageously by providing a good electrically conducting layer, preferably, the layer can be of aluminum, gold or silver. This layer can be applied to the upper surface of the semiconductor body with the exception of the resistance region. The layer is preferably applied by means of a vapor deposition. The interconnects of the resistances are connected to input terminals 16 and 17 by connecting leads 26 and 27, respectively, and to output terminals 18 and 19 via connecting leads 28 and 29, respectively. The input and output terminals are dimensioned as pass through pins which extend through corresponding bores in the base plate 10 and are electrically isolated with respect thereto.

A modified transistor holder can for example be used as a base plate 10. To isolate these pins from the base plate 10, glass linings 31 can be used. Beneath the resistances 11 to 14 there is provided a groove 33 in the base plate 10 of the bridge detector. The groove can for example be milled into the base plate 10. The resistances 11 to 14 extend unsupported over this groove. In this way, the heat conducted away from the resistances is reduced and the sensitivity of the apparatus is correspondingly increased.

According to FIG. 4 respective connecting leads can be provided for all resistances 11 to 14 of the bridge circuit between these resistances and the input terminals and output terminals. The connecting leads between the input terminal 16, 17 and resistances 11, 12 and 13, 14, respectively, are designated 42 and 43. The connecting leads of the output terminals 18 and 19 with the resistances 12, 13 and 11, 14 are designated with 45 and 44, respectively. In each instance, an end of the resistances 11 to 14 has a solder connection. For this purpose each end of a resistance is broadened to a sufficiently large surface whereas the width of the resistance itself is generally not greater than 1 mm, preferably, only less than 1/10 of a mm. The ends of the resistances are determined by means of cross-sectional widenings in combination with vaporization. With a length of the resistances of, for example, several millimeters, there is obtained a total length of a resistance pair of approximately 12 to 20 mm. This corresponds to approximately the elongation of the entire arrangement. In this way the smallest possible spacing of the parallel resistances 11 and 13 or 12 and 14, which does not substantially exceed in general 1/10 of a millimeter, is held over the entire length.

If the entire resistance arrangement is formed from a common semiconductor crystal, preferably by etching, and the resistance arrangement is subsequently secured to a base plate 10 so that the resistances 11 to 14 are arranged free carrying or unsupported over the groove 33, then the joining portions shown by dashed lines in FIG. 4 between the resistances 11, 14 and 12, 13 are removed by means of respective borings 47 and 48 or by corresponding milling actions. In the similar or same manner, the joinings at the outer ends of the resistances 11, 13 and 12, 14 are removed, preferably by mechanical separation.

In the event that the apparatus of the instant invention should be provided for determining the position of radiation of higher temperature exclusively, especially temperatures over 200° C, resistances 11 to 14, for example, can be selected having a semiconductor body made of lead sulfide (PbS). Such radiation sensitive semiconductor elements have the advantage of a relatively small time constant.

Should it also be desired to determine the position of radiation of lower temperature, it is preferable that the resistances be selected with a semiconductor body of a first crystalline phase having inclusions of a second crystalline phase. The inclusions should be of a material having a good electrical conductivity and this conductivity should be higher than that of the first phase crystalline body. For example, such a configuration is taught in German Pat. No. 1,214,807 wherein a semiconductor body of indium antimonide (InSb) with inclusions of nickel antimonide (NiSb) is disclosed.

According to U.S. Pat. No. 3,442,823 compounds of type $CB^V$ are suitable for inclusions with $A^{III}B^V$ semiconductor in which the C is an element from the group Fe, Co, Ni, Cr, and Mn, and $B^V$ is an element of Group V of the Periodic Table of Elements. Suitable inclusions can, for example, consist of FeSb, FeAs, CoAs, CrSb and CrAs as well as MnSb. In addition, vanadium-gallium $V_2Ga_5$ or gallium-vanadium-antimonide $GaV_3Sb_5$ can be used. A thermoelectronic position detector with such resistances can be used to determine the direction of radiation having a temperature down to about −40°C.

With regard to the manufacture and application of a semiconductor whose crystalline body is not crystallographically homogeneous but contains, integrally imbedded in the semiconductor substance proper, a multitude of electrically or magnetically different inclusions mutually spaced and generally aligned to form a spacial matrix within the crystal, reference may be had to U.S. Pat. No. 3,226,225.

For manufacturing the apparatus according to the invention every bolometer material having a low specific resistivity is suitable.

While the invention has been described by means of a specific example and in a specific embodiment, I do not wish to be limited thereto, for obvious modifications will occur to those skilled in the art without departing from the spirit and scope of the invention.

I claim:

1. Apparatus for detecting radiation and a change in position of a radiation source, said apparatus comprising a monolithic crystal semiconductor body having two pairs of radiation-sensitive resistances formed therein and connected in opposition in a bridge circuit, at least two of the opposing resistances functioning as radiation receivers, and being positioned in parallel and closely adjacent each other in the direction of movement of the radiation source, each of the resistances having receiving surfaces which extend in the direction of displacement of the radiation source, the resistances being stationary in position relative to radiation from the radiation source, the resistances having a central point therebetween, and said bridge circuit having output means producing an output signal which is directly proportional to the deviation of impinging radiation from the central point, said output signal having a polarity which is dependent upon the direction of the deviation.

2. Apparatus according to claim 1, said resistances being grouped in two groups of mutually opposite resistances, the resistances of each of said groups being at least substantially parallel, said two groups being disposed closely adjacent each other along a common line.

3. Apparatus according to claim 1, said resistances being formed from a semiconductor of a first crystalline phase, said semiconductor being made of a $A^{III} B^V$-semiconductor material having inclusions of a second crystalline phase, said inclusions having an electrical conductivity higher than said first phase.

4. Apparatus according to claim 1, said resistances being formed from a semiconductor body of lead sulfide (PbS).

5. Apparatus according to claim 1, further comprising a base plate having a groove, said resistances being disposed on said plate and extending unsupported over said groove.

6. Apparatus according to claim 1, further comprising connecting portions for respectively connecting said resistances to form said bridge circuit, said resistances and said connecting portions being formed from a monolithic crystal of the semiconductor.

7. Apparatus according to claim 1, further comprising a metal layer on said semiconductor, said metal layer having openings at said resistances to permit radiation to impinge upon the latter.

8. Apparatus according to claim 6, further comprising a metal layer on said semiconductor, said metal layer having openings at said resistances to permit radiation to impinge upon the latter.

* * * * *